May 28, 1940.   H. M. STOLLER   2,202,172
CONTROL SYSTEM
Filed Dec. 22, 1937   2 Sheets-Sheet 1
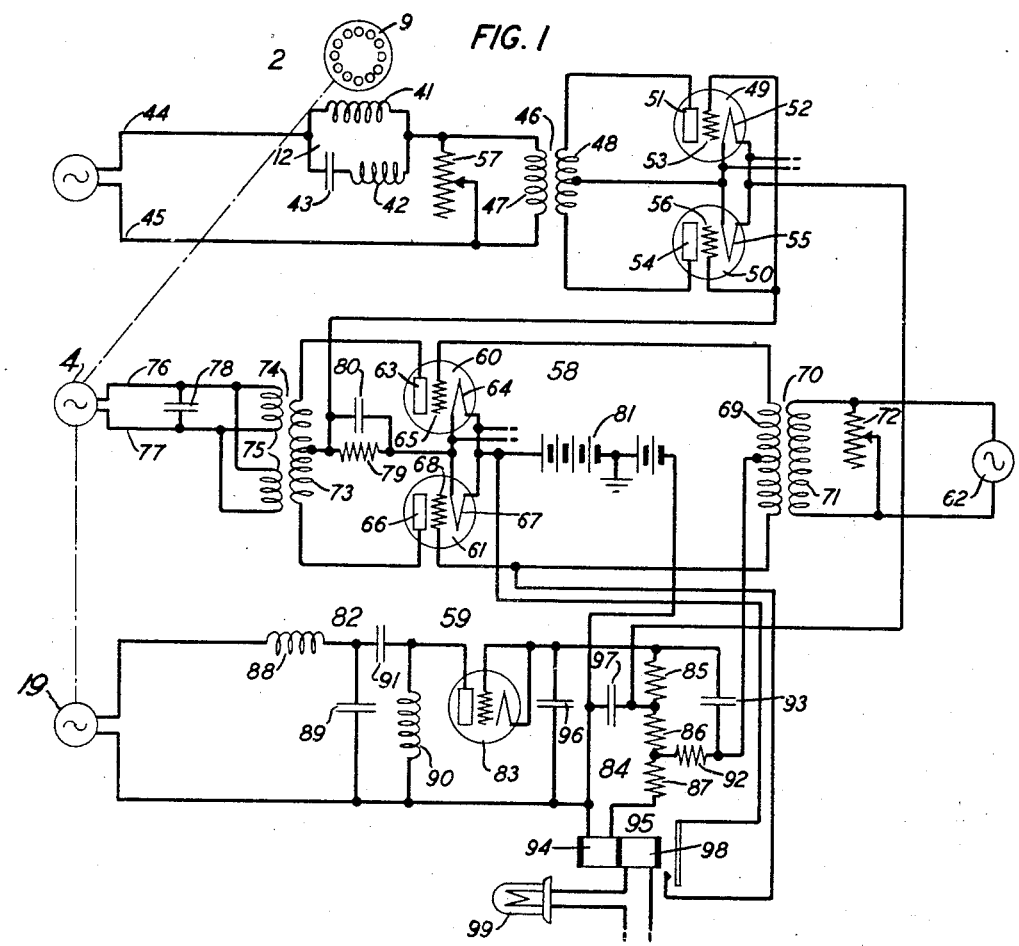
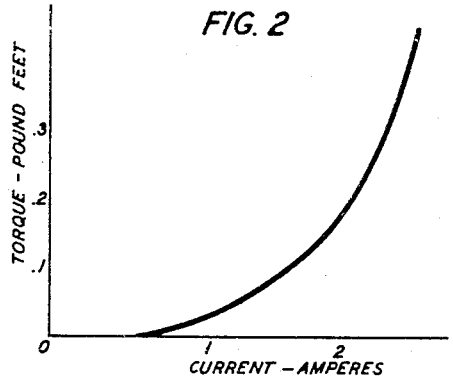
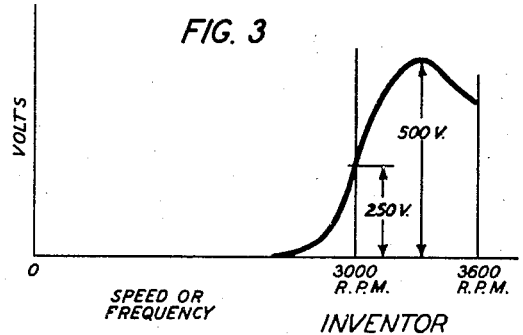
INVENTOR
H. M. STOLLER
BY Wayne B Wells
ATTORNEY INVENTOR
H. M. STOLLER
BY Wayne B Wells
ATTORNEY Patented May 28, 1940

2,202,172

UNITED STATES PATENT OFFICE 2,202,172

CONTROL SYSTEM

Hugh M. Stoller, Mountain Lakes, N. J., assignor to Bell Telephone Laboratories, Incorporated, New York, N. Y., a corporation of New York Application December 22, 1937, Serial No. 181,081

14 Claims. (Cl. 172—293)

This invention relates to control systems and particularly to control systems for governing the operation of dynamo-electric machines.

One object of the invention is to provide a speed control system that shall hold the speed of a dynamo-electric machine constant in an improved manner.

Another object of the invention is to provide a control system that shall maintain the speed of an induction motor constant with precision and that shall insure against rapid phase changes by the motor.

Another object of the invention is to provide a speed control system for an induction motor that shall vary the impedance of the motor power circuit according to the motor speed to hold the motor in synchronism with a constant frequency source and that shall additionally control the impedance of the motor power circuit to limit the rate of motor phase changes.

A further object of the invention is to provide a speed control system for an induction motor having a variable impedance in the power circuit thereof controlled by a space discharge device with a fixed bias on the grid thereof tending to lower the impedance of the power circuit that shall impress a variable potential on the grid of the device to hold the motor speed constant and that shall impress an additional bias on the grid of said device varying according to the motor speed for neutralizing the fixed bias when the motor is operating at constant speed and for assuring quick acceleration of the motor upon starting.

In operating dynamo-electric machines it is desirable, and in some cases essential, to operate the machine not only at constant speed but also to insure against any sudden phase change by the machine when operating at constant speed.

When operating a multiple frequency generator of the type disclosed in the H. M. Stoller Patent 1,687,233, October 9, 1928, it is essential that the speed control means be such that the instantaneous frequency of each carrier current at all times shall be constant within narrow limits, otherwise modulations are introduced in the speech currents and the quality of the reproduction is impaired. Constant average speed can be secured by synchronizing the driving motor with a precise standard of reference frequency such as a tuning fork. Under such conditions, however, and particularly where the rotating elements have a high moment of inertia, there is a tendency for the controlled motor to wander or hunt producing phase shifts with respect to the frequency standard even though it does not get out of step with it. Such hunting or oscillation affects the instantaneous frequency of the generator and cannot be tolerated. The addition of a flywheel will reduce the frequency of the hunting but actually increases its amplitude. It is therefore necessary to provide in the speed control system not only means for synchronizing the driving motor with a frequency standard but also stabilizing means which will control phase shifts from the standard. As will be evident from the description hereinafter disclosed, it is necessary to allow such phase shifts to occur in order to permit the speed regulator to function, but stabilization can be secured by limiting the rate at which the phase shifts are made, so that they become aperiodically damped, and the instantaneous frequency of the generator never deviates appreciably from the reference standard.

In the control system employed to describe the invention, an induction motor of the condenser split phase type is directly connected to a multiple frequency generator. The motor also drives a pilot generator developing an alternating current having a relatively low frequency as compared to the frequencies of the currents generated by the multiple frequency generator. The multiple frequency generator develops currents of five different frequencies, four of which are carrier currents and one of which is used for stabilizing purposes for supplying an inverter carrier current.

The induction motor which drives the multiple frequency generator and the pilot generator is preferably provided with a rotor of high resistance and operates with a high slip. A variable impedance is placed in the motor power circuit for varying the motor current not only to operate the motor at constant speed with precision but also to limit the rate of change in phase shifts by the motor. A high slip is used in order to be independent of the frequency variation of the current supplied to the motor and by reason of the high slip a high resistance rotor is employed.

The impedance employed to control the current supplied to the motor comprises a transformer having one winding in series with the motor power circuit. The other winding of the transformer is connected in push-pull relation to the anode circuit of two space discharge devices which are preferably of the high vacuum power type. Gas-filled tubes can be used, however, where larger amounts of power are to be controlled. The devices serve as variable resistors in controlling the impedance in the power circuit of the motor. The two space discharge devices are controlled by impressing various potentials on the grids thereof.

A speed control circuit is provided to impress a variable potential on the grids of the power devices to hold the motor speed constant with precision. The speed control circuit comprises two phase detector devices of the three-element type having the anode circuits connected to the pilot generator which develops a current of 300 cycles when the motor is operating at constant speed. The input circuits of the detector devices are connected to a constant or standard frequency source of 300 cycles. The standard frequency need not be made 300 cycles but may be made other proportional frequencies. The output potential from the phase detector devices, which varies according to the phase difference between the pilot frequency and the standard frequency, is impressed on the grids of the power devices for varying the impedance in the motor power circuit to hold the motor at constant speed.

The phase shift between the pilot generator potential and the potential of the standard frequency source has a normal value of about 90 degrees. If now a change in load or primary power supply voltage occurs, this angle of phase shift will change to a new equilibrium value. This change in phase angle requires a finite time interval, and is determined by the integral of the change in instantaneous speed times the time.

In order to prevent overshooting of the regulator which causes hunting or instability, it is necessary to provide additional means in the system which is responsive to the instantaneous speed of the motor and which will introduce an immediate correction which will govern the motor until the necessary time interval has elapsed to permit the phase detector tubes to arrive at their new equilibrium phase angle.

In this manner the high precision inherent in the reference standard is obtained, and at the same time the stability of the system is preserved. In other words, when the phase shift angle of the phase detector tube is changing, the stabilizer circuit introduces immediately an additional electromotive force on the grids of the power tubes which provides approximately the same total resultant as is finally furnished by the detector tubes alone after their new equilibrium phase shift angle has been reached. As the new equilibrium position is approached the stabilizer circuit tapers off in its action so that the instantaneous speed remains substantially constant.

One form of stabilizer system comprises a source of high frequency current from the multiple frequency generator, fed to a high-pass filter having a steep voltage characteristic at the normal operating frequency. The output from the filter is connected through a rectifier which supplies supplementary sources of grid biasing potentials to the power devices and the phase detector devices. The rectified output from the filter is impressed upon a potentiometer divided into sections. A number of the potentiometer sections are shunted by a condenser and a resistance element.

The grid circuit for the power devices includes the output from the phase detector devices, a fixed positive potential and the drop across a portion of said potentiometer in the stabilizing circuit. The drop across a portion of the potentiometer in the stabilizing circuit opposes the fixed bias on the grids of the power devices. By the above means the impedance in the power circuit of the motor is held low during starting to effect quick acceleration. When the motor is operating at normal speed the fixed bias is neutralized by the opposing bias provided by the potentiometer.

The resistance in shunt with a portion of the potentiometer and the unshunted portion of the potentiometer supply potential during transient changes in the motor speed to control the impedance in the motor power circuit and prevent phase shifts. This potential may be impressed directly on the grids of the power devices or may be impressed on the grids of the phase detector devices to obtain the amplifying effect of the detector devices.

In the accompanying drawings, Fig. 1 is a diagrammatic view of a control system constructed in accordance with the invention.

Fig. 2 is a curve showing the relation of the torque to the power current of the motor illustrated in Fig. 1.

Fig. 3 is a curve showing the frequency voltage characteristic of the high-pass filter illustrated in Fig. 1.

Figure 4:
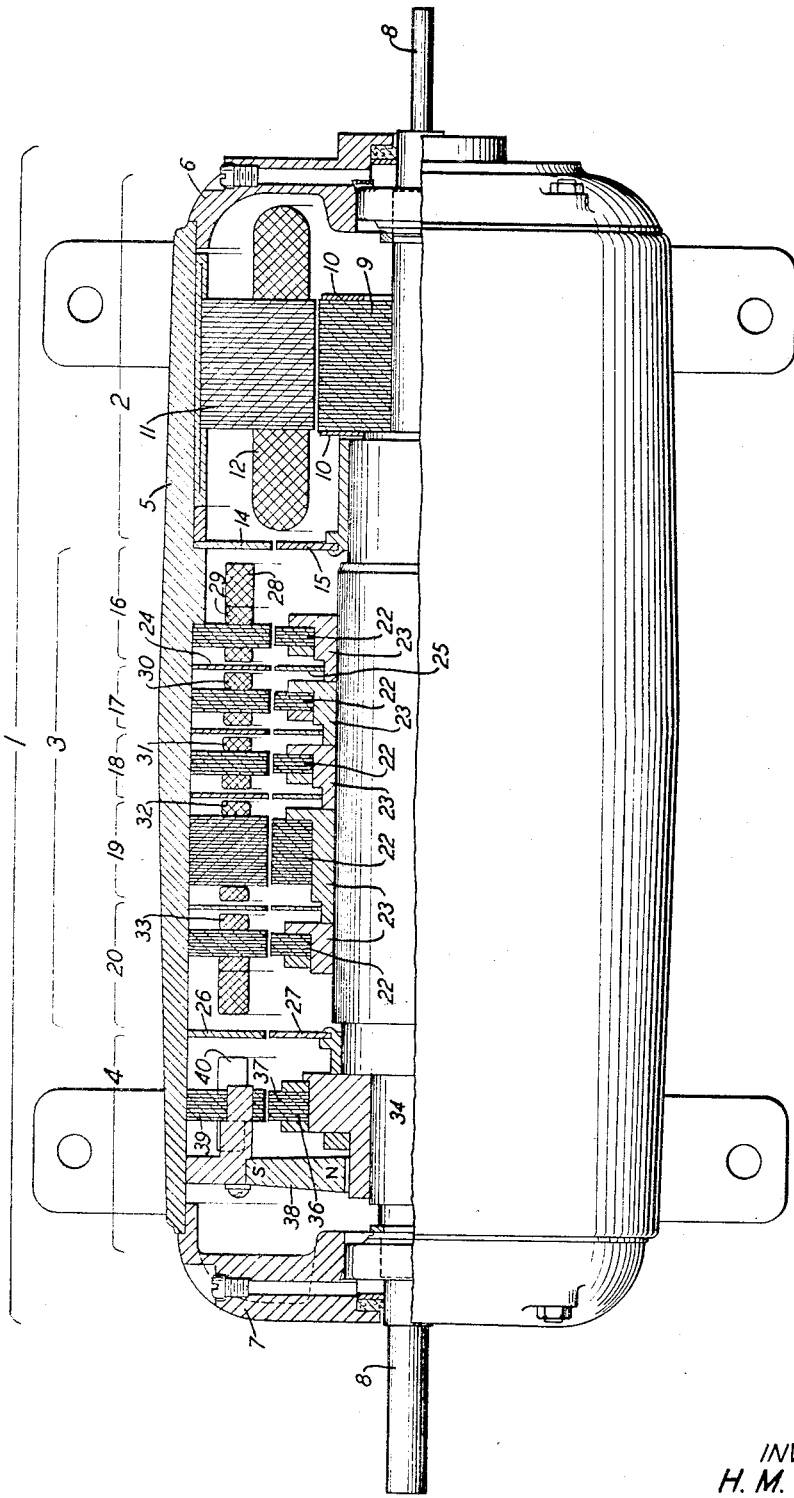
Fig. 4 is a diagrammatic view, partially in section, of the dynamo-electric machine comprising the driving motor, the multiple frequency generator, and the pilot generator.

Referring to Fig. 4 of the drawings, a dynamo-electric machine 1 is shown comprising an induction motor 2, a multiple frequency generator 3 and a pilot generator 4. The motor 2 and the generators 3 and 4 are mounted within an aluminum housing 5 having end plates 6 and 7. A shaft 8 of stainless steel, having bearings in the end plates 6 and 7, carries the rotors of the motor and the two generators. The motor 2 comprises a squirrel cage rotor 9 provided with brass rings 10 to insure a high resistance. The stator of the motor comprises a core 11 and a distributed two-phase winding 12. The rotor core 9 is mounted on the shaft 8. Suitable shielding, comprising rings 14 and 15, is provided between the induction motor 2 and the multiple frequency generator 3. The rings 14 and 15 may be composed of iron, the ring 14 being secured to the housing 5 and the ring 15 being secured to the shaft 8.

The multiple frequency generator 3 comprises five separate units 16, 17, 18, 19 and 20 for generating suitable carrier currents. The unit 16 develops a carrier current having a frequency of 3250 cycles; the unit 17 develops a carrier current having a frequency of 4900 cycles; the unit 18 develops a carrier current having a frequency of 3800 cycles; the unit 19 develops a carrier current having a frequency of 5450 cycles and the unit 20 develops a carrier current having a frequency of 4350 cycles. The rotors 22 for the units 16 to 20, inclusive, are mounted on the shaft 8 by means of brass rings 23. Suitable shielding rings 24 and 25 are provided between the various units 16 to 20, inclusive. Shielding rings 26 and 27 are also provided between the multiple frequency generator 3 and the pilot generator 4. One exciting winding 28 is provided for all the generator units 16 to 20, inclusive. Separate power windings 29, 30, 31, 32 and 33 are respectively provided for the units 16 to 20, inclusive.

The pilot generator 4 comprises a toothed rotor 34 suitably mounted on a soft iron ring 37 secured to the shaft 8. The rotor 34 comprises laminated teeth 36 mounted on the magnetic ring 37. The stator for the pilot generator comprises a permanent magnet ring 38 in magnetic connection with the stator core 39 of laminated material. The power winding 40 for the pilot generator is mounted on the core 39.

Referring to Fig. 1 of the drawings, a control system is shown for operating the induction motor 2 at constant speed with precision and for preventing phase shifts by the motor which would introduce modulations in the currents generated by the multiple frequency generator. The power winding for the induction motor 2 is shown as a split two-phase winding comprising distributed windings 41 and 42. The winding 42 is connected in series with a condenser 43. The power winding for the induction motor 2 is connected to a suitable source of alternating power by means of the conductors 44 and 45. A transformer 46 is shown in circuit with the power winding. The transformer 46 comprises a primary winding 47 in series with the windings 41 and 42 and a winding 48 connected to two three-element space discharge devices 49 and 50. The space discharge device 49 comprises an anode 51, a cathode 52 and a grid 53. The device 50 comprises an anode 54, a cathode 55 and a grid 56. The cathodes 55 and 52 are connected to a tap extending from the mid-point of the transformer winding 48. The terminals of the winding 48 are connected to the anodes 51 and 54. The cathodes 52 and 55 for the devices 49 and 50 may be heated in any desired manner.

The transformer 46, controlled by the devices 49 and 50, serves as a variable impedance in the power circuit of the motor 2. Variations in this impedance are effected by controlling the potentials impressed on the grids 53 and 56 of the devices 49 and 50. An induction motor develops a torque in proportion to the square of the current supplied to it. Therefore, by varying the current supplied to the motor 2, the torque, and hence the speed of the motor, may be controlled. In Fig. 2 of the drawings is shown a curve drawn with current as abscissae and with torque as ordinates. This curve shows how variations in the current supplied to the motor may be controlled to govern the torque and consequently to govern the motor speed. An adjustable resistance 57 is connected across the winding 47 of the transformer 46 for effecting an adjustment of the effect produced by the transformer in regulating the speed of the motor 2. The space discharge devices 49 and 50 are preferably of the high vacuum type and operate together to produce a variable impedance. A potential is impressed on the grids 53 and 56 of the devices 49 and 50 under control of a speed control circuit 58 to maintain the speed of the motor 2 constant with precision. The grids 53 and 56 are also controlled by a stabilizing circuit 59 to prevent phase shifts by the motor 2 when operating at constant speed.

The speed control circuit 58 comprises two phase-detector devices 60 and 61 which are controlled according to the phase relation between a standard source 62 of 300-cycle current and the current supplied by the pilot generator 4. The pilot generator 4 when the motor 2 is operating at normal speed supplies a 300-cycle current. The device 60 comprises an anode 63, a cathode 64 and a control grid 65. The device 61 comprises an anode 66, a cathode 67 and a control grid 68. The grids 65 and 68 of the devices 60 and 61 are connected to the terminals of the secondary winding 69 of the transformer 70. The primary winding 71 of the transformer 70 is connected to the standard source 62. The source 62 is maintained at constant frequency in any desired manner. A resistance 72 is connected across the primary winding 71 to adjust the power supplied by the source 2 to the input circuits of the devices 60 and 61. The anodes 63 and 66 of the devices 60 and 61 are connected to the terminals of the secondary winding 73 of the transformer 74. The primary windings 75 of the transformer 74 are connected to the pilot generator 4 by means of conductors 76 and 77. A suitable tuning condenser 78 is connected across the primary windings 75 of the transformer 74. A coupling resistance 79 shunted by a condenser 80 is connected between a mid-tap from the winding 73 and the cathodes 64 and 67 of the devices 60 and 61. The coupling resistance 79 impresses a variable potential on the grids 53 and 56 of the devices 49 and 50 according to the phase relation between the potentials from the source 62 and the pilot generator 4. A battery 81, having a voltage of approximately 154 volts, is also provided for impressing a fixed positive bias on the grids 53 and 56 of the devices 49 and 50. The grid circuits for the phase detector devices 60 and 61 and the grid circuits for the power devices 49 and 50 will be traced in detail when a description is given of the stabilizing circuit 59.

The stabilizing circuit 59 comprises a high-pass filter 82 which is connected to the unit 19 of the multiple frequency generator developing a current having 5450 cycles. The output from the filter 82 is connected through a suitable rectifier 83 to a potentiometer 84 comprising sections 85, 86 and 87. The filter 82 is composed of two tuned circuits respectively comprising an inductance 88 and a condenser 89, and an inductance 90 and a condenser 91. The characteristic for the high-pass filter 82 is shown by the curve in Fig. 3 of the drawings. The curve shown in Fig. 3 is drawn with speed or frequency as abscissae and volts output as ordinates. Normally the motor 2 operates at 3000 revolutions per minute with the field rotating at 3600 revolutions per minute. When the unit 19, which develops a current having 5450 cycles, is operated at 3000 revolutions per minute the output voltage from the filter 82 is approximately 250 volts. If the frequency of unit 19 rises the voltage may be raised to approximately 500 volts. The input voltage to the filter 82 is approximately 3.8 volts. By reason of the steeply sloping characteristic of the filter 82, as shown in Fig. 3 of the drawings, it is apparent that a few cycles change in the current generated by the unit 19 will produce considerable voltage change in the output of the filter.

Sections 85 and 86 of the potentiometer 84 are shunted by a resistance element 92 and a condenser 93. The junction point between the resistance element 92 and the condenser 93 is connected to a mid-tap of the secondary winding 69 of the transformer 70. The grid circuit for the power devices 49 and 50 may be traced from the grids 53 and 56 through the resistance 79 shunted by condenser 80, cathodes 64 and 67, battery 81, coil 94 of relay 95, and sections 86 and 87 of the potentiometer 84 to the cathodes 52 and 55 of the devices 49 and 50. The battery 81, as before set forth, impresses a positive bias on the grids 53 and 56 of the devices 49 and 50, tending to decrease the impedance in the power circuit of the motor 2. The drop across the sections 86 and 87 of the potentiometer 84 impresses a negative bias on the grids 53 and 56 in opposition to the fixed bias impressed on the grids by the battery 81. When the multiple frequency generator 3 is operating at normal speed, the drop across the potentiometer sections 86 and 87 will be substantially 154 volts so that battery 81 and the potentiometer sections 86 and 87 neutralize each other as to the effect on the grids 53 and 57 of the devices 49 and 50. However, during starting conditions there is very little potential drop across the potentiometer sections 86 and 87 so that the battery 81 impresses a strong positive bias on the grids 53 and 56 to lower the impedance in the power circuit of the motor 2 and insures quick acceleration in starting the motor.

The grid circuit for the grids 65 and 68 of the phase detector devices 60 and 61 may be traced from the grids 65 and 68 through the secondary winding 69, resistance element 92, potentiometer section 87, coil 94 of the relay 95 and battery 81 to the cathodes 64 and 67 of the devices 60 and 61. The devices 60 and 61 not only serve as phase detector tubes in impressing a variable potential on the grids of the power tubes, but also serve as amplifiers in amplifying voltage changes on the resistance element 92 and the potentiometer section 87 for so controlling the power devices 49 and 50 as to prevent phase shifts by the motor 2. In case of a phase shift or a transient disturbance of the motor 2, the frequency developed by the unit 19 will suddenly change to effect a quick change in the voltage output from the filter 82. This transient voltage change from the filter output will be chiefly impressed on the resistance element 92 and the potentiometer section 87 by reason of the shunting effect of the condenser 93 across the resistance sections 85 and 86. The voltage drop across the resistance element 92 and the potentiometer section 87 will be amplified by the devices 60 and 61 and impressed on the grids 53 and 56 of the power devices 49 and 50. If so desired, the potential drop across the resistance element 92 and the potentiometer section 87 may be directly impressed on the grids 53 and 56 without modification. A condenser 96 serves to smooth out the ripples in the rectified current supplied to the potentiometer 84 and a condenser 97 serves to take out a flutter frequency of approximately 50 cycles which comes from the generator unit 19.

In the operation of the speed control circuit 58 a slight reduction in the speed of the motor 2 will reduce the frequency of the pilot current supplied to the anodes 63 and 66 of the detector devices 60 and 61. This will cause a decreased negative potential to be impressed on the grids 53 and 56 of the power devices from the coupling resistance 79. Lowering the negative potential on the grids 53 and 56 lowers the impedance in the power circuit of the motor 2 to increase the speed of the motor. If the motor tends to go above normal speed an opposite effect takes place.

A relay 95, comprising a winding 94 and a winding 98, is provided for preventing overspeeding by the motor 2 in case of accident. The windings 94 and 98 are differential. The winding 94 is connected in series with the potentiometer 84 and the winding 98 is connected in the circuit of the exciting winding 28 of the multiple frequency generator 3. A suitable ballast lamp 99 is connected in circuit with the winding 98. In case the circuit of the field winding 28 of the multiple frequency generator 3 failed for any cause, the winding 98 of the relay 95 would be deenergized. The winding 94 of the relay would then operate the relay to connect the grid 68 to the cathode 67 of phase detector device 61. This connection would increase the negative bias on the grids 53 and 56 of the power devices 49 and 50 to insure against the motor 2 operating at excessive speed.

Modifications in the circuits and in the arrangement and location of parts may be made within the spirit and scope of the invention and such modifications are intended to be covered by the appended claims.

What is claimed is:

1. In combination, an induction motor having a high resistance rotor and operating with a high slip, impedance means for governing the current supplied to the power winding of said motor, a source of relatively low constant frequency current, a source of pilot current having a frequency varying according to the motor speed and having a mean frequency the same as said constant frequency current, means controlled by said two sources for controlling said impedance means to hold the motor in synchronism with said constant frequency source, a source of alternating current having a relatively high frequency varying according to the motor speed, and means governed according to the frequency of said high frequency source for additionally controlling said impedance means to stabilize the motor operation.

2. In combination, an induction motor operating with a high slip, impedance means controlled by the motor for governing the current supplied to the power winding of said motor to maintain the motor speed constant with high precision, an auxiliary source of alternating current having a frequency varying according to the instantaneous speed of said motor, and means governed according to the frequency changes of said auxiliary source for additionally controlling the current supplied to said motor to stabilize the motor operation.

3. In combination, an induction motor having a high resistance rotor and operating with a high slip, impedance means in circuit with a power winding of the motor to control the motor speed, a source of standard frequency potential, means for controlling said impedance means to synchronize the motor with the frequency of said standard frequency potential and maintain the motor speed constant, a source of auxiliary frequency potential having a frequency varying according to the instantaneous speed of said motor, and means governed according to the instantaneous frequency of said auxiliary source for controlling said impedance to stabilize the operation of said motor.

4. In combination, an induction motor provided with a load of high moment of inertia and having a power winding connected to a source of alternating current, an impedance in the circuit of said winding for controlling the current supplied thereto, a source of pilot frequency potential and a source of auxiliary potential having a relatively high frequency, each having a frequency varying according to the speed of said motor, a source of standard frequency potential having a frequency proportional to the normal frequency of the pilot potential when the motor is operating at constant speed, means governed according to the phase difference between said standard frequency potential and the pilot potential for controlling said impedance to operate the motor at constant speed, and means governed by said source of auxiliary frequency potential for controlling said impedance to stabilize the operation of said motor.

5. In combination, an induction motor having a two-phase power winding, a transformer having the primary winding thereof connected in series with said power winding, a space discharge device provided with a control grid and having the plate circuit connected to the secondary winding of said transformer, a source of pilot alternating potential having a frequency varying according to the speed variations of said motor, a source of standard frequency alternating potential, means operated according to the phase relation between said pilot potential and said standard frequency potential for controlling the potential on said grid to maintain the speed of said motor constant, an auxiliary alternating potential of relatively high frequency having a frequency variation according to the instantaneous speed of said motor, and means operated according to the frequency variation of said auxiliary potential for controlling said space discharge device to stabilize said motor and limit the rate of change of said phase relation.

6. In combination, a motor having a power winding, a transformer having the primary winding thereof connected in series with said power winding, a space discharge device provided with a control grid and having the plate circuit connected in circuit with the secondary winding of said transformer, a source of relatively low frequency pilot potential having a frequency variation according to the speed variations of said motor, a source of relatively high frequency potential having a frequency variation according to the instantaneous speed of the motor, means controlled according to the frequency changes of said pilot potential for impressing potential on said grid to maintain the motor speed constant, and means controlled according to the frequency changes of said high frequency potential for governing said device to stabilize the motor.

7. In combination, a motor having a power winding, an impedance for controlling the motor current to govern the motor speed, means controlled by said motor for controlling said impedance to maintain the motor speed constant with precision, a source of relatively high frequency potential having frequency variations according to the instantaneous speed of said motor, a resonant network connected to said source, said network having a steeply sloping attenuation characteristic in the region of the frequency of said high frequency source when the motor is operating at normal speed, means for rectifying the output from said network, and means controlled by said rectified current for effecting a change in said impedance more than proportional to voltage change of said rectified current to limit the rate of change of the instantaneous motor speed.

8. In combination, a motor having a power winding, impedance means comprising a space discharge device having a control electrode for governing the current supplied to the motor to control the motor speed, means controlled by said motor for impressing a potential on said control electrode to maintain the motor speed constant, a source of relatively high frequency potential having frequency variations according to the instantaneous speed of said motor, resonant circuit means connected to said source, said resonant circuit means having a steeply sloping attenuation characteristic in the region of the frequency of said source when the motor is operating at normal speed, a potentiometer connected to said resonant circuit means divided into sections with a part of said sections shunted by a condenser and a resistance element, and means controlled by the voltage changes in the resistance element and a part of said potentiometer for governing said space discharge device to oppose and prevent changes in instantaneous motor speed.

9. In combination, a motor having a power winding, impedance means for controlling the motor current to govern the motor speed, means controlled by said motor for controlling said impedance to maintain the motor speed constant, a source of relatively high frequency potential having frequency variations according to the instantaneous speed of said motor, resonant circuit means connected to said source, said resonant circuit means having a steeply sloping attenuation characteristic in the region of the frequency of said source when the motor is operating at normal speed, a potentiometer connected to said resonant circuit means and divided into sections with a part of said sections shunted by a condenser and a resistance element, and means controlled by the voltage changes in the resistance element and a part of said potentiometer for governing said impedance means to oppose and prevent changes in instantaneous speed of the motor.

10. In combination, a motor having a power winding, impedance means for controlling the motor current to govern the motor speed, a source of pilot potential having a frequency varying according to the motor speed, a source of standard frequency potential, means comprising a phase detector tube having an anode, a cathode and a control grid controlled by the pilot potential and the standard frequency potential jointly for governing said impedance means to maintain the motor speed constant, a source of relatively high frequency potential having a frequency varying according to instantaneous speed of said motor, means governed by said source of high frequency potential for controlling said impedance means to stabilize the motor operation, and means operative upon raising the frequency of said high frequency potential above an abnormal value to lower the impedance of said detector tube and prevent abnormal speed by the motor.

11. In combination, a motor, impedance means comprising a space discharge device having a control electrode for governing the current supplied to the motor to govern the speed thereof, means comprising a source of alternating current having a frequency varying with the motor speed for impressing a potential on said control electrode to maintain the motor speed constant, a fixed biasing potential impressed on said control electrode tending to effect quick acceleration of the motor, a second source of alternating current having a frequency varying according to the motor speed, and means comprising a high-pass filter having a steeply sloping attenuation characteristic in the region of the frequency of said second source when the motor is operating at normal speed and a rectifier controlled by said second source and connected thereto for neutralizing said fixed biasing potential when the motor is operating at normal speed.

12. In combination, a motor, impedance means comprising a space discharge device having a control electrode for controlling the current supplied to the motor to govern the motor speed, means controlled by said motor for impressing a potential on said control electrode to maintain the motor speed constant, a fixed biasing potential impressed on said control electrode tending to increase the motor speed, a source of alternating potential having a frequency varying according to the motor speed, and means comprising a high-pass filter having a steeply sloping attenuation characteristic in the region of the frequency of said source when the motor is operating at normal speed and a rectifier controlled by said source for impressing a potential varying according to the frequency of said source on the control electrode in opposition to the fixed biasing potential to neutralize said fixed biasing potential when the motor is operating at normal speed.

13. In combination, a motor, impedance means comprising a space discharge device having a control electrode for controlling the current supplied to the motor to govern the speed thereof, means controlled by said motor for impressing a potential on said control electrode to maintain the motor speed constant, a fixed biasing potential impressed on said control electrode tending to increase the motor speed, a source of alternating potential having a frequency varying according to the motor speed, resonant means connected to said source, said resonant means having a steeply sloping attenuation characteristic in the region of the frequency of said source when the motor is operating at normal speed, and control means for impressing potential output from said resonant means on said control electrode in opposition to said fixed biasing potential to enable quick motor starting, said control means neutralizing the effect of said fixed means when the motor is operating at normal speed.

14. In combination, a motor having a power winding, impedance means for governing the current supplied to the power winding of said motor, a source of constant relatively low frequency current, means for controlling said impedance means to hold said motor in synchronism with said low frequency current, a source of alternating current having a relatively high frequency and varying according to the motor speed, and means governed according to the frequency of said high frequency source motor for additionally controlling said impedance means to stabilize the motor operation.

HUGH M. STOLLER.